United States Patent [19]

Oeming et al.

[11] 3,808,653
[45] May 7, 1974

[54] DIVIDED DRIVE SINGLE SPINDLE CRANKSHAFT MACHINE

[75] Inventors: Joseph A. Oeming; Allan J. Heffrom, both of Saginaw; Arthur L. Estry, Jackson, all of Mich.

[73] Assignees: C. M. Systems, Incorporated, Saginaw; Crankshaft Machine Company, Jackson, both of, Mich. ; part interest to each

[22] Filed: Sept. 6, 1973

[21] Appl. No.: 394,747

Related U.S. Application Data

[63] Continuation-in-part of Ser. No. 170,100, Aug. 9, 1971, Pat. No. 3,757,615.

[52] U.S. Cl............................... 82/9, 82/25, 82/30
[51] Int. Cl..... B23b 5/18, B23b 21/00, B23h 19/02
[58] Field of Search................... 82/9 R, 4 B, 25, 30

[56] References Cited
UNITED STATES PATENTS

| | | | |
|---|---|---|---|
| 2,421,147 | 5/1947 | Groene | 82/9 |
| 2,269,368 | 1/1942 | Groene et al. | 82/9 |
| 2,155,857 | 4/1939 | Dreveroff | 82/9 |

*Primary Examiner*—Harrison L. Hinson
*Attorney, Agent, or Firm*—Beaman & Beaman

[57] ABSTRACT

A machine for machining the crankshaft pin bearing surfaces of a crankshaft, such as used in internal combustion engines, wherein rotatable headstock and tailstock spindles support and rotate the crankshaft during machining and tool positioning is accomplished through a master crankshaft rotated in unison with the spindles. To overcome inaccuracies resulting from gear play and cutting tool reaction forces, a portion of the torque driving the headstock and tailstock spindles is transmitted through the master crankshaft, however, the torque transmitted through the master crankshaft is limited to that necessary to overcome adverse reaction cutting forces, and the remainder of the driving torque required during machining is transmitted through a gear train directly interconnecting the headstock and tailstock spindles. Two gear trains driven from a common motor are employed to drive the crankshaft machine spindles, and torque divider means determines the amount of torque transmitted by the respective gear trains.

9 Claims, 10 Drawing Figures

DIVIDED DRIVE SINGLE SPINDLE CRANKSHAFT MACHINE

CROSS REFERENCE TO RELATED APPLICATION

This application is a continuation-in-part of applicants' copending application Ser. No. 170,100, filed Aug. 9, 1971, now U.S. Pat. No. 3,757,615 issued Sept. 11, 1973.

BACKGROUND OF THE INVENTION

The invention pertains to single spindle crankshaft machines utilizing headstock and tailstock spindles, and a master crankshaft, driven through gear trains connected to a common power source. Two gear trains are associated with the spindles and torque dividing means controls the torque transmitted by the respective gear trains.

The machining of crankshaft pin bearing surfaces requires that the forged workpiece crankshaft, prior to grinding, be formed by a turning operation. As the crankshaft pins rotate about the crankshaft axis during machining, complex tool support means are employed to produce the required tool movement. In single spindle crankshaft machines tool movement is accomplished through orbital motion producing tool supports. The motion of such tool supports is controlled by master crankshafts rotating in unison with the workpiece.

As the synchronized rotation of the crankshaft workpiece and the master crankshafts is necessary to produce accurate machining, it is the practice in a single spindle machine to power drive both the headstock and tailstock spindles through a gear train connected to an electric motor power source. Driving of the headstock and tailstock spindles reduces torsional twisting of the crankshaft workpiece throughout its length, and produces more accurate machining.

Most single spindle crankshaft machines are powered by a single electric motor, and the headstock and tailstock spindles are rotated through gear trains connected to the motor. Such gear trains include right angle drive arrangements, such as through bevel gears or worm gears. The existence of the rather complex gearing necessary results in considerable "play" due to gear teeth tolerances and clearance and during machining of the crankshaft fluctuating forces are formed which produce vibration and chatter of the tool resulting in rough machined surfaces and excessive wear of the machine components. As the crankshaft pin being machined orbits about the associated crankshaft axis, a reaction force or torque is imposed upon the crankshaft by the cutting tool opposite to that being produced by the power source to produce crankshaft rotation. This reaction force at the tool is less than the torque force imposed upon the machine crankshaft, but forces are also occurring at the tool at right angles to this reaction force which are imposed upon the master crankshaft. The master crankshaft is rotated by the same power source rotating the crankshaft workpiece and during certain portions of the master crankshaft rotation the forces imposed upon the master crankshaft by the tools are added to the reaction forces at the tool imposing a torque upon the workpiece and the sum of these forces is often capable of momentarily imposing a torque on the power train greater than that imposed by the power source. Thus, reverse forces are momentarily forced upon the machine gearing system causing a meshing of the gear teeth to resist such reverse forces and reversing the direction of force being transmitted by the gearing. Such a momentary reversal of forces imposed upon the gearing system will cause an instantaneous hesitation in the machine operation due to the existence of tolerances in the gear teeth of the power train. To overcome the aforementioned problems resulting from cutting tool reaction forces, the aforementioned patent discloses a bevel gear drive system between the headstock and tailstock spindles which includes the master crankshaft such that all of the torque transmitted from the headstock to the tailstock spindles passes through the master crankshaft. Such construction resulted in vastly improved machining characteristics, better crankshaft pin finishes, reduced machining time requirements, and improved tool life.

However, single spindle crankshaft machines constructed in accord with the aforementioned patent required very expensive components because of the single path of torque application between the headstock and tailstock spindles. Crankshaft machines constructed in accord with the aforementioned patent required custom gearing, splines and bearings of extraordinary large size which are many times more expensive to purchase and manufacture than smaller standardized sizes of equivalent components, and the present invention is a result of an improved construction which attains the superior cutting characteristics of a crankshaft machine constructed in accord with the aforementioned patent, but without requiring the expensive custom made torque transmitting components thereof.

SUMMARY OF THE INVENTION

It is an object of the invention to provide a single spindle crankshaft machine which is capable of machining a single crankshaft with a minimum of vibration and tool chatter wherein the tools are positioned by a master crankshaft and sufficient torque is imposed upon the master crankshaft to effectively resist cutting tool reaction forces to prevent gear train "play," and wherein the torque transmitted through the master crankshaft is predetermined and adjusted as to be sufficient to overcome undesirable cutting reaction forces, but not so great as to require expensive oversize torque transmitting components.

An object of the invention is to provide a single spindle crankshaft machine having powered headstock and tailstock spindles wherein first and second gear trains interconnect the spindles, one of the gear trains including the master crankshaft, and wherein torque divider apparatus is interposed between the gear trains to adjustably regulate the amount of torque transmitted through the master crankshaft.

Another object of the invention is to provide a single spindle crankshaft machine using a pair of gear trains interconnecting the headstock and tailstock spindles wherein both bevel and worm gearing is incorporated in the gear trains, and the torque ratio transmitted through the gear trains is regulated and adjusted such that selected ratios of torque are transmitted by the respective gear trains.

In the practice of the invention a crankshaft spindle axis is defined by headstock and tailstock spindles. The machine includes cutting tools mounted upon tool supports movable toward and away from the spindle axis, and the tool supports are supported upon primary and secondary master crankshafts which, when rotated, move the tools through an orbital motion. An electric motor drives a gearing system which includes first and second gear trains. The first gear train directly interconnects the headstock and tailstock spindles. The second gear train connects the headstock and tailstock spndles through the primary master crankshaft.

It is desired that the primary master crankshaft have sufficient torque transmitted therethrough to resist reaction forces imposed thereon by the cutting tools during machining. However, it is not desired that the master crankshaft transmit torques significantly higher than necessary to overcome the cutting reaction forces, as the transmission of such torques requires large gearing components requiring custom manufacture and high expense. Accordingly, a torque divider is interposed between the first and second gear trains which adjustably controls the ratio of torque being transmitted by each of the gear trains.

The torque divider includes a pair of coaxial shafts, one of the shafts being connected to one gear train, while the other shaft is connected to the other gear train, and adjustable keying means interconnect the shafts whereby relative rotational orientation between the shafts may be very accurately controlled. This keying means utilizes a recess defined upon one of the shafts spaced from the axis thereof, in which a key projection is received, and spacer members of a wedge configuration are located upon each side of the projection filling the recess. By varying the circumferential dimension of the spacers the position of the projection within the recess may be accurately determined, and the torque divider is capable of transmitting high torques while positively locating the desired rotational orientation between the shafts of the respective gear trains. The practice of the invention eliminates the necessity for nonstandard components, such as bearings, gearing and the like, thereby significantly reducing manufacturing and maintenance costs as compared with a crankshaft machine requiring such oversized specialized equipment.

BRIEF DESCRIPTION OF THE DRAWINGS

The aforementioned objects and advantages of the invention will be apparent from the following description and accompanying drawings wherein.

DESCRIPTION OF THE PREFERRED EMBODIMENT

Figure 1:
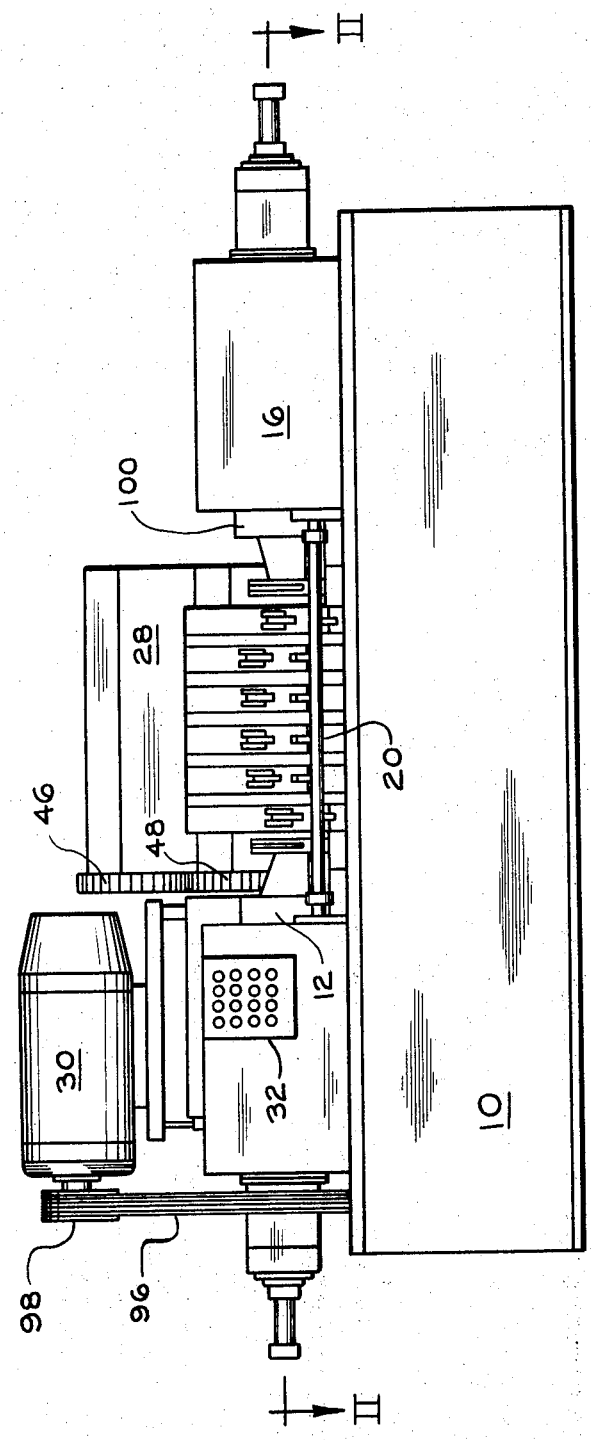
FIG. 1 is a front elevational view of a single spindle crankshaft machine incorporating the inventive features of the invention.

With reference to FIGS. 1 through 5, the single spindle crankshaft machine disclosed includes a heavy cast base 10 of a generally rectangular configuration. The upper portion of the base includes a surface upon which the major crankshaft machine components are directly or indirectly mounted, and such components include a headstock housing 12 rotatably supporting the headstock spindle 14, a tailstock housing 16 rotatably supporting a rotatable tailstock spindle 18, a drive shaft 20 disposed between the headstock and tailstock spindles in geared connection therewith by gearing systems to be later described, a primary master crankshaft 22 rotatably mounted upon spaced gearing housings 24 and 26, a secondary master crankshaft housing 28, the electric drive motor 30, and an electric control panel 32.

Figure 2:
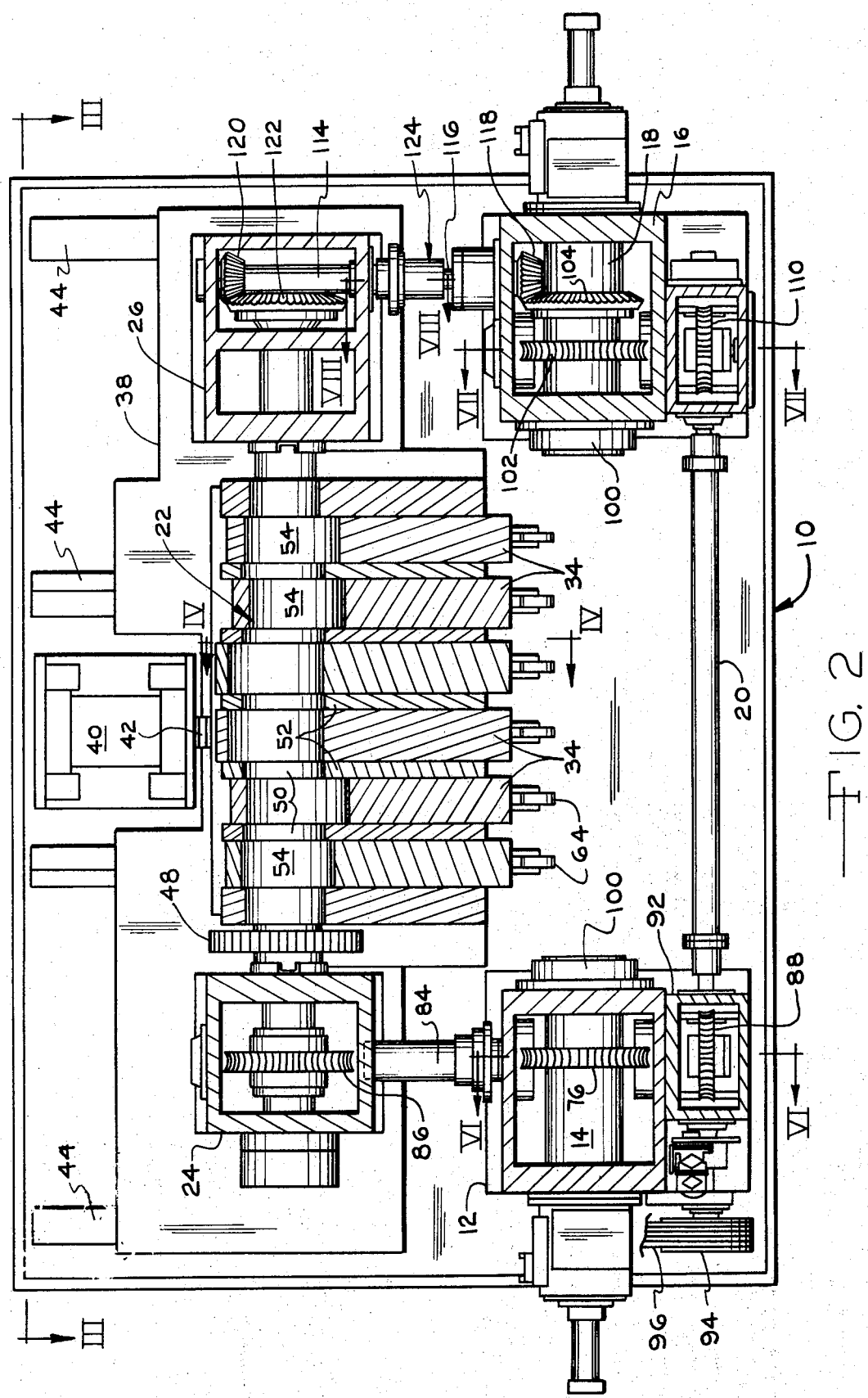
FIG. 2 is a plan, partially sectional view taken through the primary gearing components along section II—II of FIG. 1.

With reference to FIG. 2, the lower portion of the figure represents the front of the machine, and it will be appreciated that the headstock and tailstock spindles, and the drive shaft 20, are located adjacent the front of the machine, while the primary master crankshaft 22 is disposed toward the rear of the machine base.

The crankshaft turning tools are mounted upon tool support plates 34 which are supported upon the primary master crankshaft 22 and the secondary master crankshaft 36. The master crankshafts, the tool support plates 34, and the gear housings 24 and 26 are mounted upon a slide 38 controlled by hydraulically operated expansible motor 40 having a piston 42 connected to the slide whereby these components may be moved toward and away from the front of the machine base, i.e., toward and away from the axis defined by the coaxially aligned headstock and tailstock spindles 14 and 18, respectively.

Figure 3:
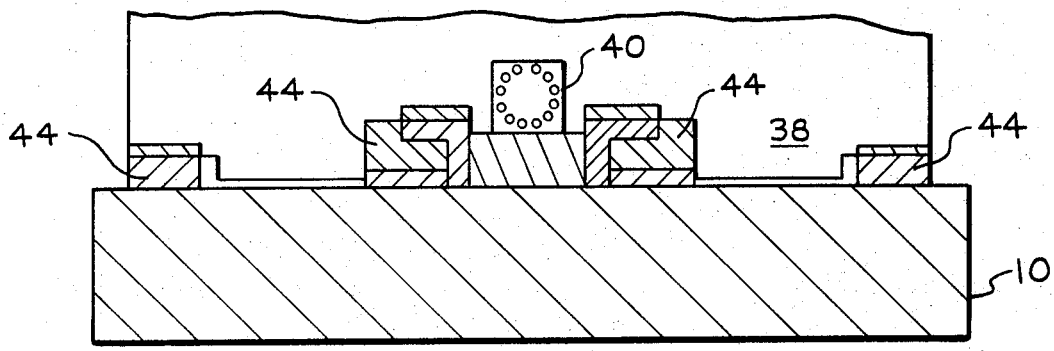
FIG. 3 is an elevational, detail sectional view taken through the base illustrating guide structure as taken along section III—III of FIG. 2.
Figure 5:
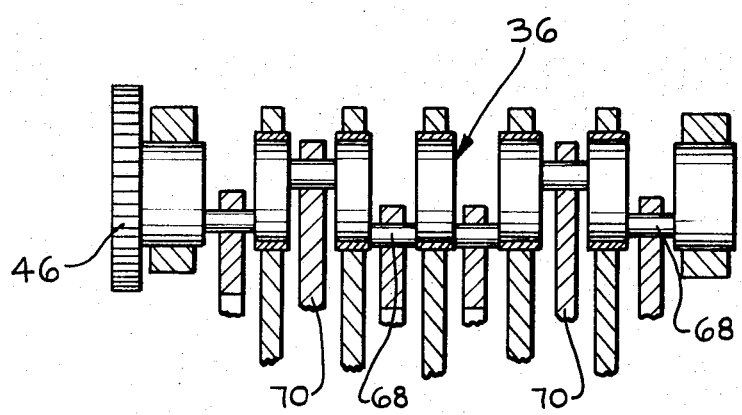
FIG. 5 is a detail, elevational, sectional view taken through the secondary master crankshaft.

The front portion of the base 10 is elevated with respect to the rear base portion and the rear base portion includes four guideways 44, FIG. 3, bolted thereto and located perpendicular to the axis of the headstock and tailstock spindles. The heavy duty slide 38 is mounted upon the guideways 44 for guided movement toward and away from the headstock and trailstock spindles. Thus, the movement of the motor piston 42 moves the slide 38 toward and away from the spindle's axis, thereby moving the master and secondary crankshafts relative to the spindle axis to bring the cutting tools into engagement with the crankshaft to be machined, which is chucked between the headstock and tailstock spindles.

The secondary master crankshaft 36 is rotatably mounted on supports mounted upon slide 38, and is driven through gear 46 which meshes with gear 48, FIG. 2, mounted upon the primary master crankshaft 22. In this manner the primary and secondary master crankshafts rotate in sychronization.

The primary master crankshaft 22 is rotatably supported in bearings 50 defined upon a plurality of vertically extending plates 52 mounted upon the slide 38. The primary master crankshaft includes crank pins 54, six in number, in the disclosed embodiment, which are of a large diameter, such as of 10 or 12 inches, located between the crankshaft bearings 50 and eccentrically disposed with respect to the crankshaft axis of rotation. The crank pins 54 may be of the adjustable type wherein the degree of eccentricity may be varied.

Figure 4:
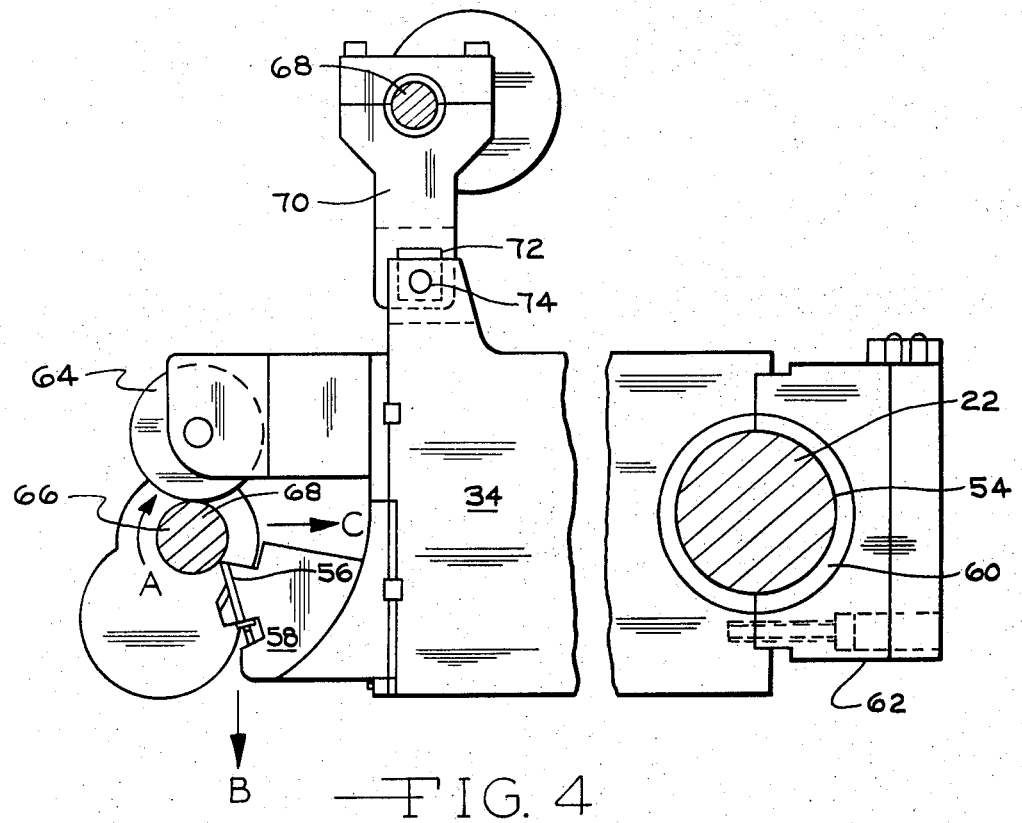
FIG. 4 is an elevational, sectional view of a tool support plate as taken along section IV—IV of FIG. 2.

The cutting tools 56, FIG. 4, consists of turning tools mounted upon toolholders 58. The toolholders 58 are mounted on tool support plates 34 disposed between and guided between the bearing plates 52. The plates 34 include bearing sleeves 60 for establishing a bearing relationship with the primary master crankshaft pins 54 and bearing caps 62 bolted to the plates maintain the tool support plates connected to the associated master crankshaft 22.

The tool plates 34 also each mount roller supports extending from the forward end thereof for rotatably mounting a roller 64, FIG. 4, adapted to rest upon the crankshaft workpiece 66 during the final states of turning, in the known manner.

Vertical orientation of the tool support plates 34 is achieved by the secondary master crankshaft 36 which is located about the tool support plates. A cover housing 28, FIG. 1, is disposed over crankshaft 36 and the crankshaft includes a plurality of bearings mounted within bearing support plates 52, FIG. 5, affixed to the slide 38, and the crankshaft pins 68 are each connected with the tool plate 34 by a connecting rod assembly 70. The connecting rod 70 includes a bolted on cap and a sleeve bearing at its upper end. The lower end of the connecting rod includes a rectangular opening 72 through which the tool plate mounted pin 74 extends, and as the vertical dimension of the opening 72 is greater than the diameter of the pin 74, a lost motion connection between the tool support plates and connecting rods of the secondary master crankshaft exist. Under usual conditions, the pin 74 will be resting upon opening lower surface and the pins 74 will be supporting the weight of the tool support plates 34 adjacent the tools 56. It is only during the final stages of turning, when the rollers 64 engage the pins of the crankshaft being machined, that the tool support plates are supported by the rollers 64, and guided thereby.

Figure 6:
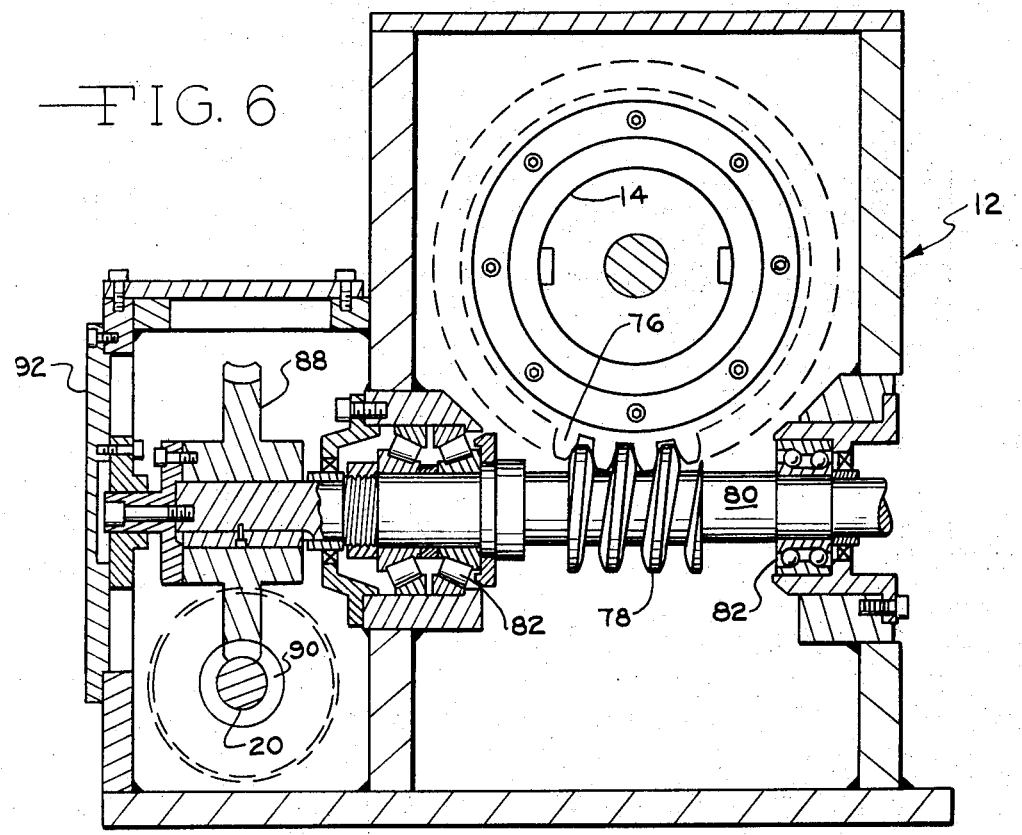
FIG. 6 is an elevational, sectional view illustrating headstock spindle gearing mechanism as taken along section VI—VI of FIG. 2.

The headstock structure will be appreciated from FIGS. 2 and 6. The headstock spindle 14 is rotatably mounted upon bearings, not shown, for rotation about an axis coaxial with the rotatable tailstock spindle 18. A worm wheel 76 is concentrically affixed upon the headstock spindle, and meshes with a worm 78 mounted upon rotatable shaft 80 journaled within the headstock housing upon antifriction roller and ball bearings 82. The shaft 80 extends rearwardly, to the right in FIG. 6, in a driving connection, through telescoping spline means 84, to drive the primary master crankshaft worm wheel 86 through a shaft and worm, not shown. The "front" end of the shaft 80 includes a worm wheel 88 keyed thereon which meshes with a worm 90 mounted upon the drive shaft 20 which is rotatably supported upon bearings, not shown, within the housing 92. The left end of the drive shaft 20, FIG. 2, includes a multiple groove pulley 94 receiving drive belts 96 which pass over the motor mounted pulley 98 wherein the motor 30 directly drives the drive shaft 20 through the belts. From the above it will be appreciated that rotation of the drive shaft 20 thereby produces rotation of the headstock spindle 14, and the primary master crankshaft worm wheel 86.

Figure 7:
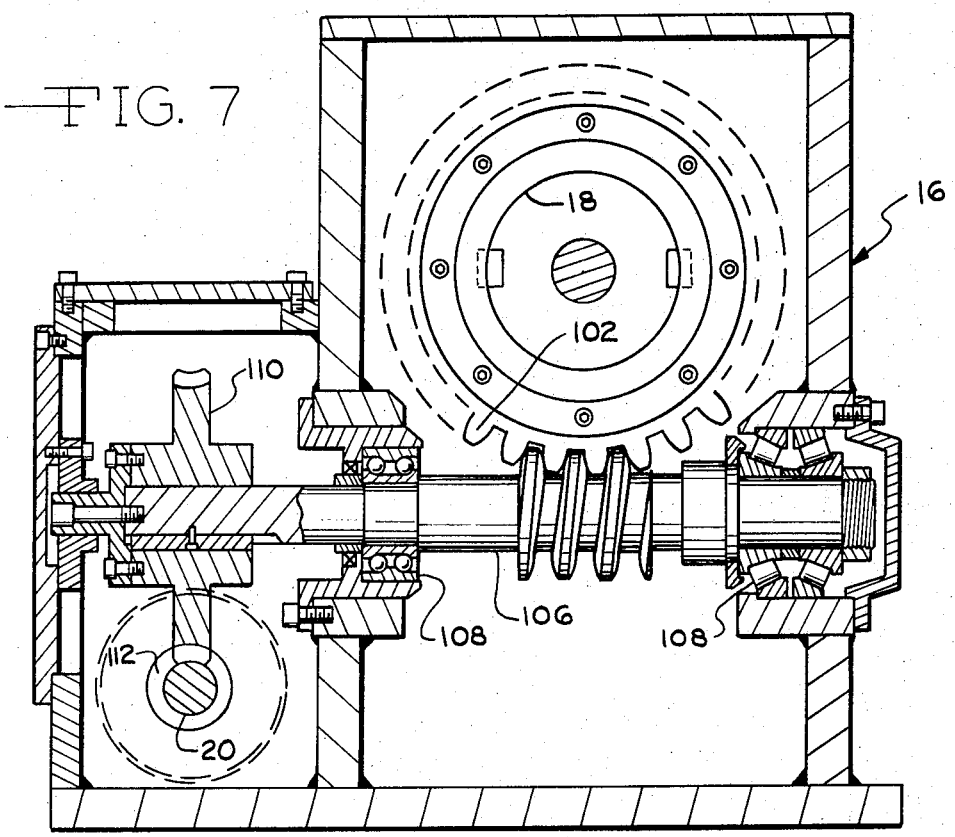
FIG. 7 is an elevational, sectional view of tailstock gearing structure as taken along section VII—VII of FIG. 2.

The tailstock spindle gearing structure will be appreciated from FIGS. 2 and 7. The tailstock spindle 18 is rotatably mounted upon bearings within the tailstock housing 16 for coaxial rotation with respect to the headstock spindle 14. The spindles 14 and 18 both include chucking means 100 for gripping the crankshaft workpiece 66. A worm wheel 102 is fixed upon the tailstock 18, and a bevel gear 104 is also fixed upon the tailstock spindle for rotation therewith. A transversely disposed shaft 106 is rotatably mounted within the tailstock housing 16 upon antifriction bearings 108, and the "front" end of the shaft 106 has a worm wheel 110 keyed thereto. The worm wheel 110 meshes with a worm 112 defined upon drive shaft 20 whereby rotation of the drive shaft rotates the shaft 106 and the tailstock spindle 18. It will therefore be appreciated that the headstock and tailstock spindles are drivingly interconnected through the drive shaft 20.

The right end of the primary master crankshaft 22, FIG. 2, is gearingly connected to the tailstock spindle 18 by means of a telescopic splined interconnection as described below. The primary master crankshaft drive shaft 114 is rotatably mounted upon bearings, not shown, located within the housing 26, and a short coaxial splined shaft 116 is rotatably mounted upon bearings supported on tailstock housing 16. The shaft 116 includes a bevel gear 118 meshing with the tailstock spindle gear 104 whereby rotation of the shaft 116 and tailstock spindle 18 simultaneously occurs. Likewise, a bevel gear 120 keyed upon shaft 114 meshes with the bevel gear 122 mounted upon the primary master crankshaft 22. Telescoping torque divider means, generally indicated at 124, is interposed between the shafts 114 and 116, and is later described.

The chuck means 100 located upon the headstock and tailstock spindles are operated by hydraulic actuating means associated with the spindles, and appropriate controls, hydraulic pumps and other control equipment forms a part of the machine of the invention, but is not described as such apparatus is conventional and forms no part of the present invention.

During the machining of the crankshaft workpiece pins 68 the torque transmitted from the headstock spindle to the tailstock spindle is divided between torque transmitted by the drive shaft 20, and the primary master crankshaft gearing, and crankshaft workpiece 66 is rotated in the direction indicated by the arrow A, FIG. 4. The forces imposed upon the cutting tools 56 are downwardly, as indicated by arrow B, and rearwardly, as indicated by arrow C. The reaction to forces in the direction B tends to impose a torque on the crankshaft workpiece 66 opposite to that being produced by the motor drive, and the drive train rotating the headstock and tailstock spindles. The cutting forces in the direction C are imposed upon the crank pins 54 of the primary master crankshaft 22. It will be appreciated that the existence of the force C on the crank pins 54 causes opposite reaction forces upon the primary master crankshaft depending upon the relationship of the crank pin to its crankshaft axis of rotation. Such reaction forces are also imposed upon the gearing of the machine. The reaction forces imposed upon the headstock and tailstock spindles due to the forces in the direction B, and the reaction forces imposed upon the primary master crankshaft due to the forces in the direction C are transmitted to the gearing and the sum of these reaction forces is less than the torque forces produced by the electric motor 30 during machining. These feedback reaction forces constitute a biasing force upon the gearing of the power train which insures that the same side of the gear teeth of the meshing bevel gear sets and the teeth of the worm and worm wheel engage at all times and thus any play, wear or tolerances that may exist in the gear teeth will not affect operation of the machine during machining.

In the previously mentioned patent all of the torque transmitted through the gearing system between the headstock and the tailstock spindles was through the primary master crankshaft in order to compensate for the reaction forces occurring during cutting, but it has been discovered that with the practice of the present invention considerably smaller and less expensive drive components may be utilized than with the previous crankshaft machine if only a portion of the torque transmitted between the tailstock and headstock spindles is transmitted through the primary master crankshaft, such portion being sufficient to overcome the aforedescribed reaction forces. Accordingly, torque divider means 124 is utilized to control the percentage of the torque transmitted between the headstock and tailstock spindles by the drive shaft 20 and through the master crankshaft 22 whereby a majority of the necessary torque is transmitted through the drive shaft 20, while the master crankshaft 22 transmits only sufficient torque to prevent the play in the gearing and provide opposition to the cutting reaction forces necessary to produce superior machining characteristics.

Figure 8:
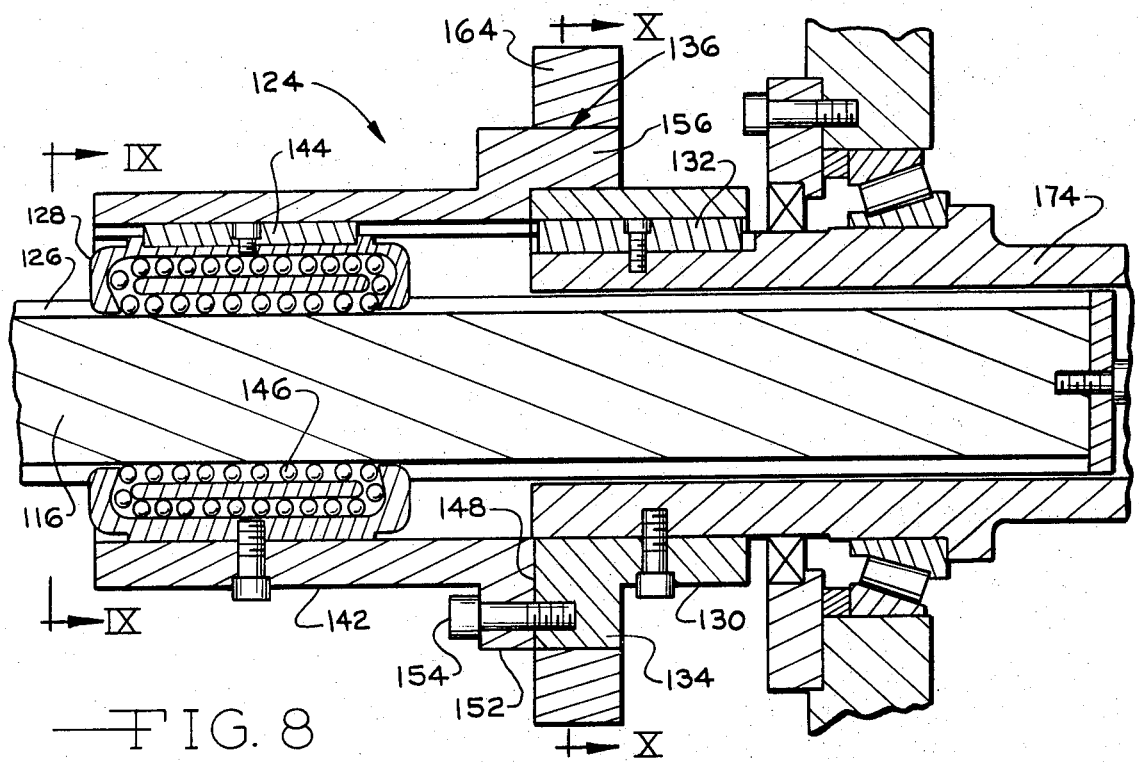
FIG. 8 is an enlarged, diametrical, elevational, sectional view taken through the torque dividing means along section VIII—VIII of FIG. 2.
Figure 9:
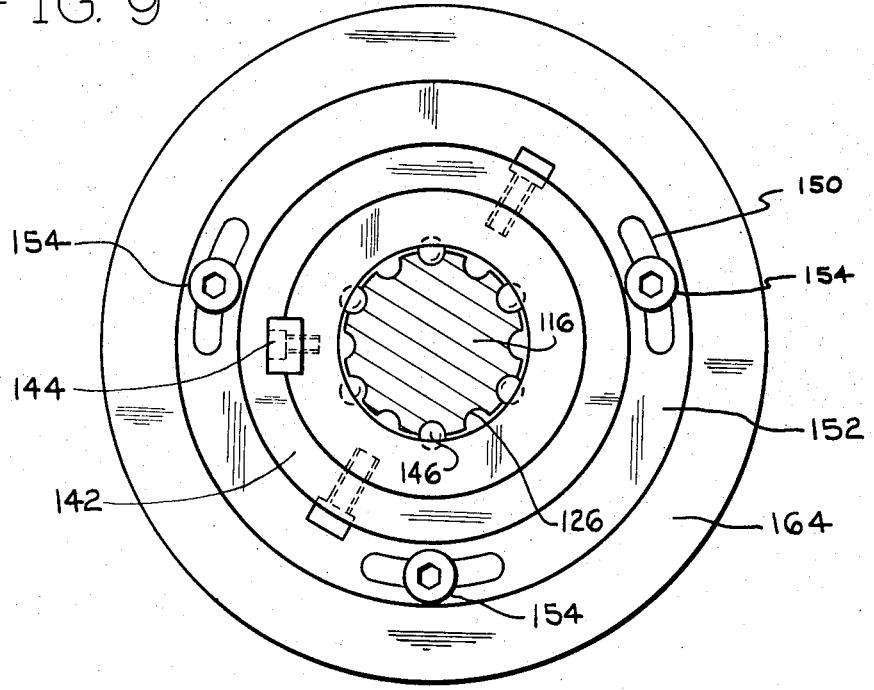
FIG. 9 is an elevational, sectional view taken along section IX—IX of FIG. 8.
Figure 10:
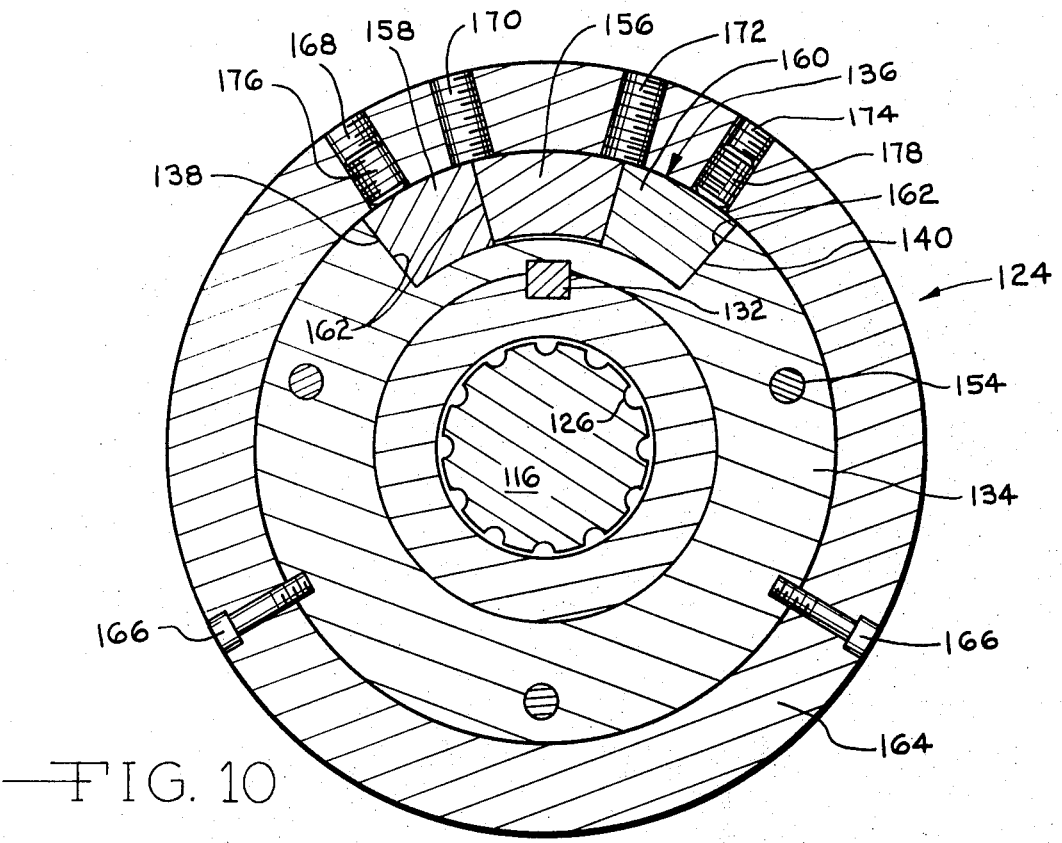
FIG. 10 is an elevational, sectional view taken through the torque divider along section X—X of FIG. 8.

The torque dividing means 124 in accord with the invention is best understood from FIGS. 8, 9 and 10. In these figures the shaft 116 will be understood to include longitudinally extending splines 126 of semicylindrical configuration for cooperation with the annular ball spline member 128 rotatable with the shaft 114. Thus, the splines 126 and the ball spline member 128 permit relative axial movement between the splines 114 and 116, in a manner similar to the telescoping spline means 84 associated with shaft 80.

The torque divider apparatus includes means for angularly adjusting the relative rotational positions of the shafts 114 and 116. Such structure includes a sleeve 130 which is keyed to the shaft 114 by key 132, FIG. 8. The sleeve 130 is of an annular configuration and includes an enlarged diameter cylindrical flange 134 having a circumferential notch 136, FIG. 10, defined therein intersecting the periphery of the flange. The notch 136 is circumferentially defined by radially extending abutment surfaces 138 and 140.

An annular hub 142 circumscribes the shaft 116, and serves as the support for the ball spline member 128. The ball spline member 128 is keyed to the hub by key 144, FIG. 8, and includes a plurality of balls 146 movably mounted within ball races within the member in the known manner. The balls 146 are closely received within the spline grooves 126 of the shaft 116, in the known manner, and thus the shaft 116 may be axially translated with respect to the ball member 128 with little friction, but relative rotation between the hub 142 and the shaft 116 is prevented. As noted in FIG. 8, the end of shaft 114 is hollow in order to telescopically receive the end of the shaft 116.

The hub 142 includes a radially disposed end flange surface 148 adapted to bear against the leftmost radial surface of the sleeve flange, FIG. 8, and slots 150 are defined in the enlarged flange portion 152 of the hub for receiving cap screws 154 threaded into threaded holes defined in the sleeve flange 134. Unloosening of the screws 154 permits relative rotation between the hub 142 and the sleeve 130 during torque dividing adjustment as limited by the extent of the slots 150.

The hub 142 includes an axially extending key projection 156 received within the notch 136 defined in sleeve 130. The key 156 is of a wedge-like cross-sectional configuration, FIG. 10, and is of significantly less circumferential dimension than the notch 136. In order to produce a positive keying of the hub to the sleeve a pair of wedge-shaped spacers 158 and 160 are located upon opposite circumferential sides of key 156. The circumferential dimensions of the spacers 158 and 160 are closely controlled as these spacers determine the relative rotational orientation between the shaft 114 and the shaft 116, and thus the percentage of torque transmitted through the drive shaft 20 and the primary master crankshaft 22. The radial surfaces 162 of the wedge spacers 158 and 160 are accurately ground such that the total circumferential dimension of the spacers equals the difference between the circumferential dimension of the key 156 and the notch 136. If it is desired to vary the relative rotational positions between the shafts 114 and 116, spacers 158 and 160 of different circumferential dimension than the spacers previously used are employed, and by using a spacer of greater circumferential dimension than the previous spacer used on one side of key 156 and a spacer of lesser circumferential dimension on the opposite side of the key, the relative rotational positions of the hub 142 and sleeve 130 may be adjusted, and it will be appreciated that during such adjustment the cap screws 154 are unloosened slightly to permit rotation of the hub relative to the sleeve. Upon the desired rotational adjustment occurring, the cap screws are retightened.

The wedge spacers 158 and 160 are maintained within the notch 136 by a retaining collar 164 embracing the sleeve flange 134. The collar 164 is bolted to the sleeve flange by bolts 166, FIG. 10, and a plurality of threaded holes 168, 170, 172, and 174 are radially formed in the collar in orientation with the notch 136. As illustrated in FIG. 10, a set screw 176 within the threaded hole 168 bears upon wedge 158 maintaining the same in position and preventing axial displacement thereof. A set screw 178 within threaded hole 174 bears upon wedge spacer 160 maintaining the same in position. If sufficient rotational adjustment between the hub 142 and the sleeve 130 is produced by using different circumferential dimensioned wedges than those illustrated, the set screws 176 and 178 may have to be relocated in threaded holes 170 or 172 in order to be aligned with a wedge spacer in order for a set screw to engage a spacer, and for this purpose the pair of extra threaded holes are formed in the collar.

AS the ball spline assembly prevents relative rotational movement between the shaft 116 and the hub 142, and as the key 132 prevents relative rotation of the sleeve 130 relative to shaft 114, a positive rotational driving interconnection between shafts 114 and 116 is produced due to the reception of the key 156 within the notch 136, and the close and very accurate confinement of the key within the notch as determined by the wedge spacers 158 and 160. Rotational adjustment between the shafts 114 and 116 can be very accurately made by varying the circumferential width of the spacers a 0.001 inch, or less, to vary the back pressure and control the "play" in the gearing, and thus the disclosed torque divider permits a very accurate regulation of the torque transmittable between the headstock and tailstock spindles as produced by the drive shaft 20 and the primary master crankshaft 22.

In operation, a crankshaft workpiece 66, FIG. 4, is chucked within the headstock and tailstock chucks 100. The usual steady-rests, not shown, and other conventional crankshaft machine equipment such as chip removers, and the like, are omitted from the drawings as they form no part of the invention, but such steadyrests are normally employed for association with the crankshaft workpiece bearings in order to support the crankshaft during machining of its pins. The motor 40 is energized such that the piston rod 42 is retracted, and the slide 38 will be removed its greatest distance from the axis of a headstock and tailstock spindles, such axis constituting the axis of the crankshaft workpiece. Upon the energizing of the electric motor 30 the shaft 20 is rotated, and the gearing of the machine will be energized.

Rotation of the shaft 20 rotates the primary master crankshaft 22 and the headstock and tailstock spindles and a rotational torque is transmitted by the primary crankshaft as determined by the adjustment of the torque divider 124.

The expansible motor 40 is pressurized to slowly move the slide 38, and structure mounted thereon, toward the crankshaft workpiece 66, and during the phase the tools 56 will be orbiting in a circular manner under the influence of the primary master crankshaft 22, and the secondary master crankshaft 36. At this time the pin 74 will be resting upon the lower surface of opening 72 of connecting rod 70 mounted upon the secondary crankshaft 36 whereby the secondary crankshaft produces the vertical movement of the support plates 34 and turning tools, while the primary master crankshaft 22 produces the horizontal tool displacement. Movement of the slide 38 continues towards the crankshaft workpiece and upon the tools 56 engaging the crankshaft workpiece cheeks and pins 68, machining thereof will occur. Extension of the piston rod 42 is adjusted at a rate proportional to the desired tool feed rate and due to the orbiting motion of the tools, cutting of the crank pins occurs throughout the complete rotation of the crankshaft workpiece. During the later stages of machining the rollers 64 mounted upon the tool plates 34 will engage the machine surface of the crank pins and the weight of the tool plate adjacent the tool is then supported by the roller and crankshaft, and the pin 74 is lifted from the connecting rod opening surface and lost motion occurs between the connecting rod and the pin 74. Once the turning operation is completed the expansible motor 40 is energized to retract the piston rod 42 and move the slide 38 and cutting tools away from the crankshaft workpiece. The motor 30 is then deenergized such that the headstock and tailstock spindles cease rotation to permit unchucking of the machine workpiece crankshaft and rechucking of the next crankshaft to be machined occurs.

It has been determined that if approximately 30 percent of the necessary torque to rotate the crankshaft workpiece is transmitted through the primary master crankshaft sufficient torque exists in the primary master crankshaft to resist the aforementioned reaction forces and permit excellent cutting characteristics and the desired finish on the machined surface of the crankshaft pins 68. Accordingly, the remaining 70 percent of torque being transmitted between the headstock and tailstock spindles is through the drive shaft 20. By dividing the torque between the drive shaft 20 and the primary master crankshaft, conventional sizes of gearing may be used in the machine of the invention substantially reducing the cost of manufacture, yet by maintaining sufficient torque within the primary master crankshaft, the cutting reaction forces are sufficiently opposed to produce superior cutting forces and play which may exist in the machine due to gear teeth clearances will have no effect upon the operation of the machine. The very accurate regulation of torque division as produced by the torque dividing apparatus permits close control of the cutting characteristics of the machine in accord with the invention and significantly reduces the cost of crankshaft machine manufacture.

Various embodiments to the inventive concept may be apparent to those skilled in the art without departing from the scope of the invention.

We claim:

1. A single spindle crankshaft machine comprising, in combination, a base, a headstock spindle and a tailstock spindle coaxially rotatably mounted upon said base adapted to hold a crankshaft to be machined chucked therebetween, an electric motor mounted on said base, a master crankshaft rotatably mounted on said base having an axis parallel to and spaced from the axis of said spindles, cutting tool support means including cutting tools mounted on said base for movement toward and away from the axis of said spindles connected to said master crankshaft, a first gear train directly interconnecting said headstock and tailstock spindles, a second gear train including said master crankshaft connected to said headstock and tailstock spindles, drive means connecting said electric motor to one of said drive trains for rotating said spindles and master crankshaft, and torque dividing means interposed between said first and second gear trains dividing the torque transmitted therebetween whereby the torque transmitted by said second gear train is sufficient to overcome reaction forces imposed on said master crankshaft by said tool support means during cutting tending to rotate said master crankshaft in a direction opposite to that driven by said second gear train, the remainder of the torque necessary to drive said headstock and tailstock spindles being transmitted by said first gear train.

2. In a single spindle crankshaft machine as in claim 1 wherein said first gear train includes a first gear set connected to said headstock spindle, a second gear set connected to said tailstock spindle, and a drive shaft interconnecting said gear sets, said electric motor being drivingly connected to said first gear set.

3. In a single spindle crankshaft machine as in claim 2 wherein said second gear train includes a third gear set connecting one end of said master crankshaft with said headstock spindle, and a fourth gear set connecting the other end of said master crankshaft with said tailstock spindle, said torque dividing means being located within said second gear train between one of said spindles and the associated end of said master crankshaft.

4. In a single spindle crankshaft machine as in claim 3 wherein said fourth gear set includes a first right angle gear drive connected to said tailstock spindle and a second right angle gear drive connected to said other end of said master crankshaft, said torque dividing means being located in said fourth gear set between said first and second right angle gear drives.

5. In a single spindle crankshaft machine as in claim 1 wherein said torque dividing means includes first and second coaxial shafts, said first shaft being connected to said first gear train and said second shaft being connected to said second gear train, and adjustable keying means keying said first and second shafts in a predetermined adjusted rotational relationship with respect to the axis of said first and second shafts to produce a predetermined torque transmitting ratio between said first and second gear trains.

6. In a single spindle crankshaft machine as in claim 5 wherein said adjustable keying means comprises an axially extending recess defined on one of said shafts radially spaced from the axis of said shaft and having a circumferential dimension defined by radially extending abutment surfaces, an axially extending key projection defined upon the other shaft received within said recess and having a circumferential dimension less than that of said recess, a pair of spacer members within said recess, a spacer member being located circumferentially on each side of said key projection closely received in said recess between said key projection and a recess abutment surface whereby the circumferential dimension of said spacer members and key projection is equal to the circumferential dimension of said recess as defined by said abutment surfaces.

7. A single spindle crankshaft machine comprising, in combination, a base, a headstock spindle and a tailstock spindle coaxially rotatably mounted on said base adapted to hold a crankshaft to be machined chucked therebetween, an electric motor mounted on said base, a master crankshaft rotatably mounted on said base having an axis parallel to and spaced from the axis of said spindles, cutting tool support means including cutting tools mounted on said base for movement toward and away from the axis of said spindles connected to said master crankshaft, first and second gear trains interconnecting said headstock and tailstock spindles for rotating said spindles in unison, said second gear train including said master crankshaft whereby the torque transmitted through said second gear train is transmitted through said master crankshaft, drive means connecting said electric motor to said drive trains for rotating said spindles and master crankshaft, and torque dividing means interposed between said first and second gear trains dividing the torque transmitted to said spindles by said gear trains between said gear trains in a predetermined manner whereby the torque transmitted by said second gear train is sufficient to overcome cutting tool reaction forces imposed on said master crankshaft by said tool support means during cutting tending to rotate said master crankshaft in a direction opposite to that driven by said second gear train, the remainder of the torque necessary to simultaneously drive said headstock and tailstock spindles being transmitted by said first gear train.

8. In a single spindle crankshaft machine as in claim 7 wherein said torque dividing means includes first and second coaxial shafts, said first shaft being connected to said first gear train and said second shaft being connected to said second gear train, and adjustable keying means keying said first and second shafts in a predetermined adjusted rotational relationship with respect to the axis of said first and second shafts to produce a predetermined torque transmitting ratio between said first and second gear trains.

9. In a single spindle crankshaft machine as in claim 8 wherein said adjustable keying means comprises an axially extending recess defined on one of said shafts radially spaced from the axis of said shafts and having a circumferential dimension defined by radially extending abutment surfaces, an axially extending key projection defined upon the other shaft received within said recess and having a circumferential dimension less than that of said recess, a pair of spacer members within said recess, a spacer member being located circumferentially on each side of said key projection closely received in said recess between said key projection and a recess abutment surface whereby the circumferential dimension of said spacer members and key projection is equal to the cricumferential dimension of said recess as defined by said aboutment surfaces.

* * * * *